(12) United States Patent
Paganelli et al.

(10) Patent No.: US 12,249,743 B2
(45) Date of Patent: *Mar. 11, 2025

(54) METHOD FOR CONTROLLING HUMIDITY IN A FUEL CELL

(71) Applicant: Symbio, Fontaine (FR)

(72) Inventors: Gino Paganelli, Cottens (CH); Lionel Jeanrichard-dit-Bressel, Formangueires (CH)

(73) Assignee: Symbio, Fontaine (FR)

(*) Notice: Subject to any disclaimer, the term of this patent is extended or adjusted under 35 U.S.C. 154(b) by 0 days.

This patent is subject to a terminal disclaimer.

(21) Appl. No.: 17/245,608

(22) Filed: Apr. 30, 2021

(65) Prior Publication Data
US 2021/0344027 A1 Nov. 4, 2021

(30) Foreign Application Priority Data
Apr. 30, 2020 (FR) ..................... 2004319

(51) Int. Cl.
*H01M 8/04828* (2016.01)
*H01M 8/04119* (2016.01)
(Continued)

(52) U.S. Cl.
CPC ... *H01M 8/04828* (2013.01); *H01M 8/04179* (2013.01); *H01M 50/414* (2021.01); *H01M 50/497* (2021.01)

(58) Field of Classification Search
CPC ............. H01M 8/045; H01M 8/04179; H01M 8/04231; H01M 8/04388; H01M 8/04507;
(Continued)

(56) References Cited

U.S. PATENT DOCUMENTS

| 2005/0214605 A1* | 9/2005 | Saitoh | H01M 8/04388 429/444 |
| 2008/0160363 A1* | 7/2008 | Tsukada | H01M 8/04141 429/513 |

(Continued)

FOREIGN PATENT DOCUMENTS

| CN | 109888337 A | * 6/2019 |
| CN | 111063916 A | * 4/2020 |

(Continued)

OTHER PUBLICATIONS

KR20150077926A, Cho Sung Mun, "Apparatus and Method for improving cold starting failure in fuel cell vehicle", retrieved Aug. 31, 2022 (Year: 2015).*

(Continued)

*Primary Examiner* — Ekandra S. Miller-Cruz
*Assistant Examiner* — Jared Hansen
(74) *Attorney, Agent, or Firm* — Thompson Coburn LLP; Steven M. Ritchey

(57) ABSTRACT

A method for controlling humidity in a fuel cell, wherein hydrogen is fed at a nominal pressure to the inlet of the cell, characterized in that at predetermined periodicity the following steps are repeated: instruction is given to open a hydrogen purge valve arranged on the outlet of the anode circuit; the pressure of hydrogen is measured at the inlet to the anode circuit of the cell, and the measured value is compared with a threshold pressure value; the purge valve is closed when the measured pressure is equal to or lower than the predetermined threshold pressure value; the opening time of the purge valve is measured; and the humidity level prevailing at the cathode of the cell is inferred therefrom.

14 Claims, 3 Drawing Sheets

(51) Int. Cl.
*H01M 50/414* (2021.01)
*H01M 50/497* (2021.01)

(58) Field of Classification Search
CPC ......... H01M 8/04686; H01M 8/04753; H01M 8/04761; H01M 8/04828; H01M 50/414; H01M 50/497; H01M 2008/1095; Y02E 60/10; Y02E 60/50
See application file for complete search history.

(56) References Cited

U.S. PATENT DOCUMENTS

| | | | | |
|---|---|---|---|---|
| 2012/0148927 | A1* | 6/2012 | Jeon | H01M 8/04843 429/414 |
| 2012/0308906 | A1* | 12/2012 | Paganelli | H01M 8/04671 429/429 |
| 2013/0149620 | A1* | 6/2013 | Fabian | H01M 8/04208 429/443 |
| 2017/0294665 | A1 | 10/2017 | Ok et al. | |
| 2018/0294497 | A1 | 10/2018 | Asai | |
| 2019/0312289 | A1* | 10/2019 | Paganelli | H01M 8/04231 |
| 2020/0144642 | A1* | 5/2020 | Kwon | H01M 8/04097 |

FOREIGN PATENT DOCUMENTS

| | | | | |
|---|---|---|---|---|
| FR | 3060860 A1 | * | 6/2018 | ........ H01M 8/04097 |
| JP | 2007080753 A | | 3/2007 | |
| JP | 2007184136 A | | 7/2007 | |
| JP | 2008204957 A | | 9/2008 | |
| JP | 2011216341 A | | 10/2011 | |
| JP | 2011216416 A | * | 10/2011 | |
| JP | 2018205180 A | | 12/2018 | |
| JP | 2020021533 A | | 2/2020 | |
| KR | 20150077926 | * | 7/2015 | |

OTHER PUBLICATIONS

Battrell, Logan, et al. "Quantifying cathode water transport via anode relative humidity measurements in a polymer electrolyte membrane fuel cell." Energies 10.8 (2017): 1222 (Year: 2017).*
CN109888337A Xu, et al., "Automatic humidification control method and automatic humidification control system of fuel cell", machine English translation retrieved from https://worldwide.espacenet.com/ Date: Jul. 6, 2023 (Year: 2019).*
CN111063916A Tang, et al., "Fuel cell anode water management system and control method", machine English translation retrieved from https://worldwide.espacenet.com/ Date: Jul. 6, 2023 (Year: 2020).*
JP2011216416A, Hamachi et al., "Fuel cell system and film wet condition determination method for the same", machine English translation retrieved from https://worldwide.espacenet.com/ Date: Sep. 6, 2023 (Year: 2011).*

* cited by examiner

METHOD FOR CONTROLLING HUMIDITY IN A FUEL CELL

CROSS-REFERENCE TO RELATED APPLICATIONS

This application claims the benefit of FR 2004319 filed on Apr. 30, 2020, which is incorporated herein by reference in its entirety.

TECHNICAL FIELD AND STATE OF THE PRIOR ART

The present invention relates to fuel cells, in particular to polymer membrane fuel cells fed with hydrogen, and concerns a method for controlling the humidity of a fuel cell allowing the detection of a level of excessive relative humidity prevailing at the cathode of the cell.

Fuel cells are used as power source in various applications, in particular in electric vehicles. In fuel cells of proton-exchange membrane type (PEMFC), hydrogen is used as fuel which is fed to the anode of the fuel cell, whereas the cathode is fed with oxygen as oxidizer. Proton-exchange membrane fuel cells (PEMFC) comprise a Membrane Electrode Assembly (MEA) comprising an electrolytic proton-exchange membrane in solid polymer that is electrically non-conductive, having the anodic catalyst on one of the sides thereof and the cathodic catalyst on the opposite side. A membrane electrode assembly (MEA) is sandwiched between a pair of electrically conductive elements, or bipolar plates, by means of gas diffusion layers, these layers being formed of carbon cloth for example. The bipolar plates are generally rigid and thermally conductive. They chiefly act as current collectors for the anode and cathode and comprise channels provided with suitable openings to distribute the gaseous reactants of the fuel cell over the surfaces of the respective anodic and cathodic catalysts, and to evacuate the water produced at the cathode. A cell of a fuel cell is therefore formed by a MEA, including the gas diffusion layers and two monopolar plates.

A fuel cell may comprise a single cell or a plurality of cells in the form of a stack. A stack is therefore composed of several individual cells connected in series.

When in operation, an electrical voltage is produced at the terminals of the cells further to an electrochemical oxidizing reaction of hydrogen at the anode and an electrochemical oxygen-reducing reaction at the cathode. The resultants of these reactions are the production of electricity at the terminals of the electrodes, and of water and heat at the cathode of the cell.

To optimise the functioning of a fuel cell of PEMFC type, and hence the quantity of electricity produced by the cell, the humidity of the cell must be controlled. More specifically, the polymer membranes used as electrolyte in fuel cells of PEMFC type need humidity to ensure good proton conductivity. On the other hand, when humidity is excessive at the cathode, and in particular when it is close to or beyond saturation, liquid water is formed and risks causing flooding of the active layer with the gas flow no longer being able to circulate properly, which has negative consequences on the proper functioning and hence on the production of electricity by the cell, but also on the lifetime thereof.

From JP2011/216341 it is known to drive a purge valve using the pressure prevailing within a gas-liquid separator, without this being of use to determine the level of humidity in a fuel cell.

In the state of the art, solutions are known which relate to the use of a humidity sensor installed on the hydrogen feed circuit of the cell and/or on the oxygen feed circuit which are connected to a control circuit controlling the operation of the cell as a function of values received from the humidity sensors. For example, document JP2009/129684 describes a method for controlling a fuel cell which controls the decrease in power generated by the cell when the humidity sensors, installed on the cathode circuit and on the anode circuit, detect a humidity level lower than a pre-set limit.

However, it has been ascertained that the addition of one of more humidity sensors in a fuel cell leads to complex operation thereof and requires sensor maintenance to be taken into consideration, in particular with regard to corrosion problems and subsequent loss of accuracy.

In addition, when humidity at the cathode is excessive, it tends to cause excess liquid water also at the anode further to a back-diffusion mechanism; to ensure proper operation of the cell, it is necessary to evacuate the excess water at the anode by means of periodic purges. In this case also, there is a need to know the level of humidity at the cathode, but it is difficult to embed a humidity sensor at the cathode outlet of a fuel cell.

SUMMARY OF THE INVENTION

It is one objective of the invention to overcome the aforementioned shortcomings at least in part, and to propose a robust, reliable solution allowing measurement of excessive humidity within the cell, whilst allowing evacuation of liquid water at the anode.

The objective of the invention is reached with a method for controlling humidity in a fuel cell, whereby hydrogen is fed at a nominal pressure ($P_{nom}$) to the inlet of the cell, characterized in that at predetermined periodicity the following steps are repeated:

- instruction is given to open a hydrogen purge valve arranged on the outlet of the anode circuit;
- the pressure of hydrogen is measured at the inlet to the anode circuit of the cell, and the measured value is compared with a predetermined threshold pressure value ($P_{low}$);
- the purge valve is closed when the measured pressure is equal to or lower than the predetermined threshold pressure value ($P_{low}$);
- the time elapsed between the opening and closing of the purge valve is measured; and
- the humidity level prevailing in the cell is inferred therefrom.

In a proton-exchange membrane fuel cell, water is produced at the cathode. However, it has been experimentally shown that liquid water occurs at the anode outlet when the humidity at the cathode outlet is increased due to a back-diffusion phenomenon. This phenomenon is chiefly attributable to the permeability of the membrane which allows the passing of some of the water produced at the cathode towards the anode through the membrane. In the method of the invention, the purge valve is opened to evacuate the liquid water present at the anode and gases, while at the same time monitoring the pressure values at the input of the purge valve. In the invention, the purge valve remains open until a low limit of measured pressure is reached. As a result, the opening time of the purge valve is adapted to the amount of water present at the anode. Since liquid water is more viscous than the gas, in this case hydrogen, the greater the amount of water at the anode the longer the time needed to reach the low pressure value $P_{low}$, and hence the longer the purge valve must remain open. Therefore, purge time is automatically adapted as a function of the amount of water at the anode, so that only strictly necessary purging is applied irrespective of conditions and using a single sensor i.e. the sensor measuring hydrogen pressure at the inlet to the cell. In addition, the opening time of the purge valve can advantageously be used as an indicator of the presence of liquid water at the anode. In the invention, the humidity level within the cell can be inferred by measuring the opening time of the purge valve. As a result, it can be ensured that the humidity at the cathode outlet side does not exceed a critical level, when action on cell operation can be taken as appropriate and without having to embed a humidity sensor.

Advantageously, cell operation can be adjusted when the opening time of the purge valve exceeds a pre-set value, to ensure optimum operation of the cell.

A mean can be computed of several successive measurements of purge valve opening time, to infer the humidity level therefrom, which will provide a reliable measurement and avoid measurement noise.

In one aspect of the invention, the opening time of the purge valve can be measured and said periodicity can be adapted as a function of the measured time. As explained above, the purge time is automatically extended in the event of water at the anode to compensate for the length of time during which the valve evacuates water and not gas. Therefore, the opening time of the purge valve increases with the amount of liquid water present at the anode. On this account, the more this time length is extended the shorter the intervals between purge operations so that it is possible to adapt the periodicity of purging to the opening time of the purge valve and to evacuate all excess water efficiently at the anode.

Feeding of hydrogen to the cell can be obtained from a tank by means of a proportional solenoid valve driven by a pressure regulator connected to a pressor sensor. This allows precise adjustment of feed pressure to the fuel cell, the pressure regulator being connected to a pressure sensor positioned at the inlet to the cell to control opening of the solenoid valve.

Said pressure regulator can be deactivated during the opening time of the purge valve. The purpose is to prevent counter-reaction of the proportional solenoid valve from perturbing pressure change during purging. The regulator is reactivated immediately after closing of the purge valve.

In one advantageous aspect of the invention, the $P_{low}$ pressure values can be between 70 and 95% of $P_{nom}$. During laboratory tests it was found that with this range of pressure values it is possible to obtain proper purging of a fuel cell under all operating conditions thereof. The value $P_{low}$ can be constant or can be adapted to operating conditions, for example as a function of the current produced by the fuel cell.

The values of pressure $P_{nom}$ can be between 1.2 and 2 bar.

Said periodicity can be between 2 s and 20 s for an opening time of the purge valve of possibly between 500 ms and 100 ms. Therefore, for a long opening time, the intervals between purges are shorter and increase when the opening time of the purge valve is decreased at a previous purge.

In the method of the invention, when the purge valve is opened, the time can be measured after which the value $P_{low}$ is reached starting from the value $P_{nom}$, and it is compared with a maximum value. If the measured time exceeds the maximum time, it is possible to identify a situation in which the purge valve is jammed in the closed position.

It is also possible, when the purge valve is closed, to measure the time after which the value $P_{nom}$ is reached starting from the value $P_{low}$, and to compare this with a time interval. If the measured time exceeds this interval, it is inferred that the pressure does not reach the value $P_{nom}$ and it is inferred that the purge valve is jammed in the open position.

Advantageously, when the opening time of the purge valve is below a threshold value, it is inferred that the humidity level prevailing at the cathode lies within a range lower than a threshold value.

In another advantageous aspect, when the opening time of the purge valve lies above a threshold value, it is inferred that the humidity level prevailing at the cathode lies within a range higher than a threshold value, and the value of the humidity level is determined on the basis of an unambiguous relationship between opening time and humidity level.

The objective of the invention is also reached with a device for implementing the method of the invention, which comprises a purge valve, a pressure sensor and a control unit of a fuel cell.

A further objective of the invention is the use of the device for implementing the method of the invention in a fuel cell.

BRIEF DESCRIPTION OF THE FIGURES

The invention will be better understood on reading the remainder of the description given in connection with the following figures.

In the different figures, same or similar elements carry the same reference. The description thereof is therefore not systematically reproduced.

DETAILED DESCRIPTION OF PARTICULAR EMBODIMENTS

Figure 1:
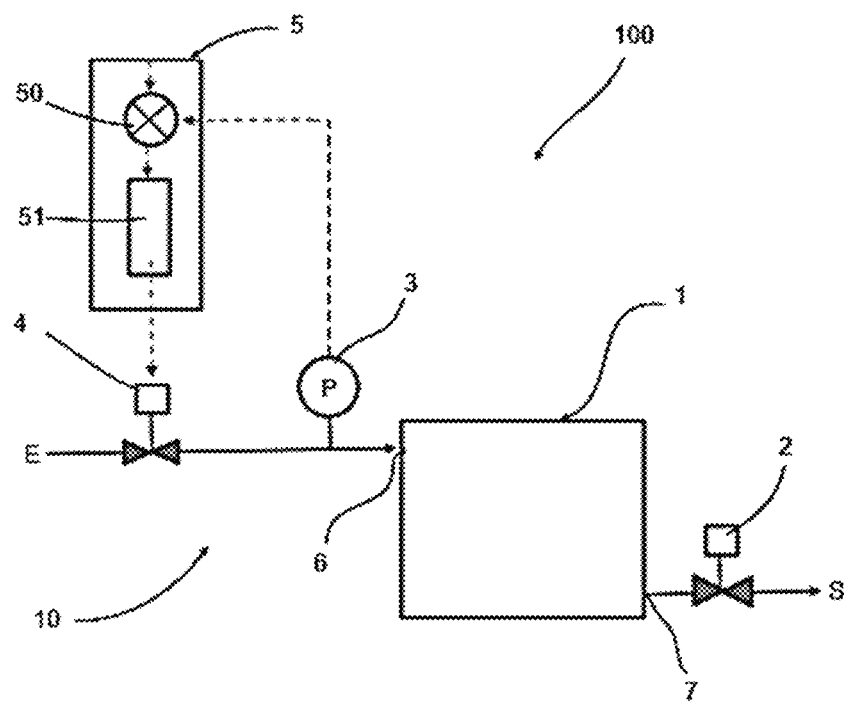
FIG. 1 is a schematic view of the device for implementing the method of the invention.

FIG. 1 schematically illustrates a device 100 for implementing the method of the invention, installed on the anode circuit 10 of a fuel cell 1. More specifically, FIG. 1 illustrates the topology of the anode circuit 10 of the cell between an inlet E for hydrogen, derived for example from a pressurized hydrogen tank (not illustrated) and an outlet S of the cell under atmospheric pressure. The fuel cell 1 is fed with hydrogen via a proportional solenoid valve 4. This solenoid valve is driven by a regulator 5 to maintain the pressure at the inlet 6 to the cell at a predetermined value. For this purpose, a pressure sensor 3 is installed on the anode circuit just before the hydrogen inlet 6 into the fuel cell 1, and it is connected to the input of the regulator 5. The regulator 5 is of the type generally known and operates by means of a pseudo-analogue signal of Pulse Width Modulation (PWM). More specifically, the measurement signal sent by the sensor 3 arrives at a comparator 50 of the regulator which receives a set value. The output value of the comparator 50 is transmitted to a control unit 51 of the regulator which actuates the proportional solenoid valve 4. The set pressure value $P_{nom}$ is generated by the fuel cell controller. It can be constant or adapted to operating conditions, for example as a function of the current produced by the fuel cell.

As can be seen in FIG. 1, on the anode circuit 10 after the cell outlet 7, there is arranged a purge solenoid valve 2 of «On/Off» type driven by a control unit of the cell (not illustrated). The purge 2 is preferably positioned at a low point of the outlet collector of the anode circuit so that it is able to drain the liquid water.

In one variant, not illustrated, means are added to the anode circuit 10 for the recirculation of hydrogen, for example comprising a Venturi ejector arranged between the proportional solenoid valve 4 and the pressure sensor 3, so as to recirculate part of the gas at the outlet 7 before the purge valve 2.

Figure 2:
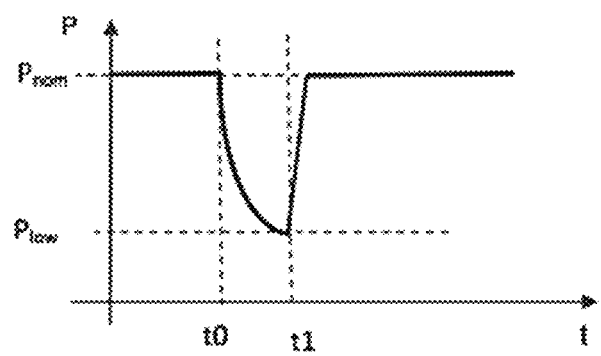
FIG. 2 is a graph illustrating changes in pressure as a function of time.

FIG. 2 is a graph illustrating the principle for measuring the opening time of the purge valve 2, the time values in seconds being given along the X-axis and the pressure values in bars along the Y-axis. Anodic pressure at the inlet 6 to the cell is regulated at a set pressure value $P_{nom}$ via the proportional valve 4 and the regulator 5. The cell control unit controls opening of the purge valve 2. As soon as the purge valve is opened at time to, a rapid decrease is observed in hydrogen pressure measured by the pressure sensor 3. When the pressure reaches the threshold $P_{low}$, the purge valve 2 is closed. The opening time T of the purge valve, equalling t1−t0, is used by the computer as indicator of the presence of water at the anode. It is observed that the greater the amount of liquid water at the anode outlet the longer the time needed to reach pressure $P_{low}$ due to the very high viscosity or density of water and the time it takes to escape via the purge valve, compared with the situation in which only gas needs to be evacuated by this same purge valve. During the opening time of the purge valve 2, the instruction given by the pressure regulator 5 remains fixed at the value at the instant preceding the purge so that counter-reaction of the proportional valve 4 does not perturb pressure change during the purge. Immediately after the purge, the pressure regulator is released and again activates the proportional valve 4 for return to the target pressure $P_{nom}$.

The purge time T is therefore automatically adapted to the amount of liquid water at the anode. The more water there is, the longer the time needed to reach pressure $P_{low}$. The purge time will be automatically lengthened in the event of the presence of water, to tend towards compensating for the purge time during which the purge valve 2 was employed for the evacuation of water and not gas.

In the invention, the opening time of the purge valve T=t1−t0 is used to determine the humidity level at the cathode of the cell.

Figure 4:
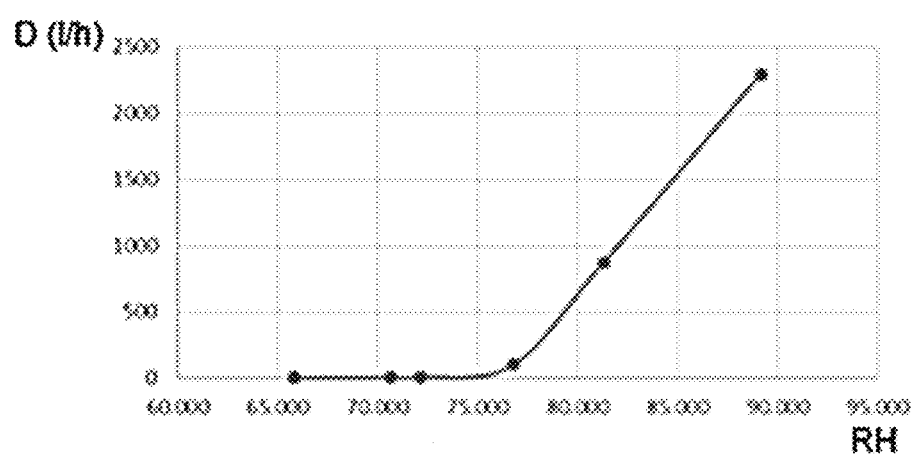
FIG. 4 is a graph illustrating the relationship between the amount of liquid water at the anode and the humidity prevailing at the cathode of a fuel cell.

The water produced by a fuel cell normally occurs at the cathode. It is experimentally shown however that liquid water occurs at the anode outlet when the humidity at the cathode outlet is increased due to a back-diffusion phenomenon. In FIG. 4 the amount of water present at the anode is shown along the Y-axis by its volume flow rate D, measured in l/h, and the level of relative humidity (RH) is given along the X-axis, as measured in a laboratory at the cathode outlet of a proton-exchange membrane fuel cell (PEMFC) comprising 256 cells of 300 A. It is therefore noted that, on and after a certain threshold, the water flow rate at the anode outlet increases with the humidity present at the cathode. Up to 75% RH (relative humidity), there is little or no liquid water at the anode outlet, liquid water at the anode outlet starts to occur on and after this threshold and the amount of liquid water present at the anode is thereafter strongly increased. It is therefore ascertained that liquid water is not present at the anode outlet when the relative humidity measured at the cathode is equal to or lower than 75%. Yet this threshold of 75% RH is the level which corresponds to the recommended operation of a fuel cell.

As explained above, periodic purges are carried out at the anode outlet using the device in FIG. 1. According to the functioning of this device, the opening time of the purge valve 2 at the anode outlet is automatically adapted as a function of the amount of liquid water at the anode outlet. In the invention, the opening time of the purge valve 2 is measured and this is used as indicator of the presence of liquid water at the anode outlet. Next, according to the measured values of purge valve opening time, the amount of liquid water at the anode outlet can be inferred therefrom and the humidity level at the cathode of the fuel cell is determined.

Figure 5:
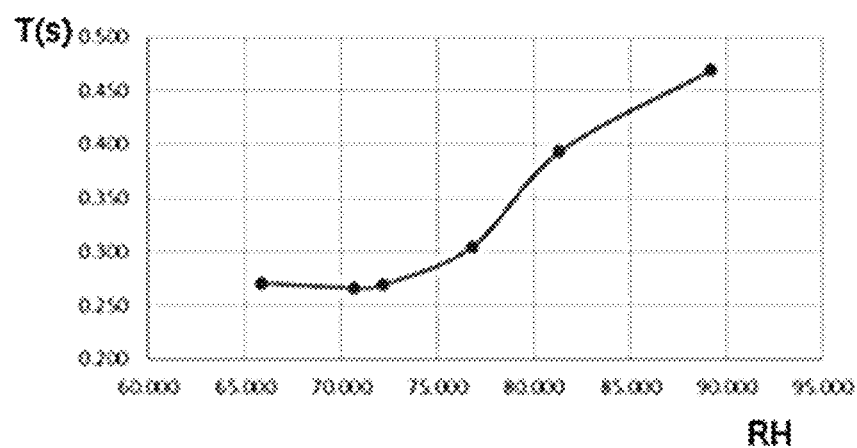
FIG. 5 is a graph illustrating the variation in purge time as a function of the humidity prevailing at the cathode of a fuel cell.

For the same cell as the one used to plot the graph in FIG. 4, laboratory measurements were used to plot the values of the graph in FIG. 5. The Y-axis indicates the opening time in seconds of the purge valve 2 at the anode outlet, and the X-axis gives % relative humidity measured at the cathode outlet of the cell. It is observed that the opening time of the purge valve 2 is constant and less than 0.3 s when the relative humidity measured at the cathode is lower than 75%, i.e. for recommended cell operation. Therefore, when the opening time of the purge valve is less than 0.3 s, it can be inferred that the level of relative humidity prevailing at the cathode is less than 75%.

When the opening time of the purge valve 2 is longer than 0.3 s, the level of relative humidity prevailing at the cathode can be inferred from the graph in FIG. 5, to the right of the value of 75%. In this case, the information obtained is more precise than when the level of relative humidity is lower than 75%. From the opening time of the purge valve 2, not only can it be inferred that the relative humidity prevailing at the cathode is higher than 75%, but the value of this humidity level is also known.

The value of 75% indicated above is an example and may vary as a function of the structure and operating conditions of the fuel cell 1, in particular as a function of the number of cells in the stack. This value is a first threshold value S1.

Similarly, the value of 0.3 s is an example and may vary as a function of the structure and operating conditions of the fuel cell 1, in particular as a function of the number of cells in the stack. This value is a second pre-set threshold value S2.

In the event that the opening time is less than the threshold value S2, the deducing or determining of the humidity level lies within a range, namely between 0 and the threshold value S1, between 0 and 75% in the example.

In the event that the opening time is longer than the threshold value S2, the measured opening time of the purge valve 2 is between 0.3 and 0.5 s, the level of relative humidity at the cathode increases to reach about 90% RH and the humidity level is inferred or determined both within a range, namely above this threshold value S1, and precisely by means of the unambiguous relationship between RH level and opening time T as represented by the curve seen on the right of the threshold value S1=75% in FIG. 5.

In this case also, the opening time of the purge valve on the anode side is sent to the control unit of the cell which acts on the operating parameters thereof such as: humidification (when actively managed), pressure, stoichiometry or temperature or any other parameter able to modify the humidity level to obtain optimum operation. For example, in the event that the opening time of the purge valve is longer than the second purge value S2, the operating parameters of the fuel cell are adjusted.

In one variant, the control unit of the cell records the measured values of the opening time of the purge valve 2 over several successive measurements and then computes a mean of these values before taking a decision determined by the presence of liquid water at the anode. This allows the preventing of measurement noise on purge valve opening time.

Figure 3:
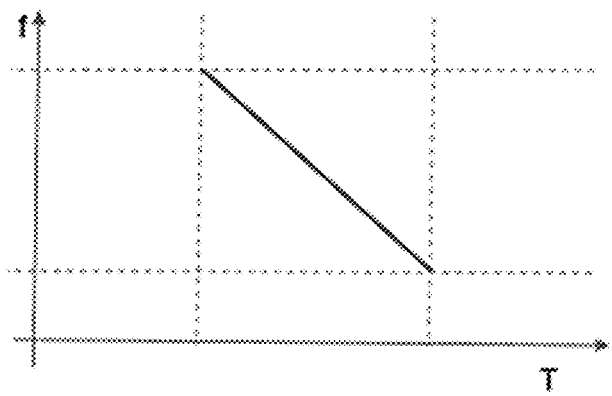
FIG. 3 is a graph illustrating the relationship between opening time of the purge valve and periodicity of purges.

In another advantageous aspect of the invention, in addition to automatic adapting of purge time, in the event of the presence of water, the time or period between two successive purges is also reduced for better compensation. FIG. 3 shows the relationship between the purge time T in seconds measured by the control unit of the cell and periodicity fin seconds applied between purges. It can be seen that the longer the purge time revealing the presence of increasing amounts of water, the shorter the intervals between successive purges to promote the evacuation of excess water and to ensure sufficient purging despite the presence of water. This mapping is predetermined by means of prior fine-tuned calibration to guarantee that the liquid water at the anode is sufficiently drained to prevent degradation of the cell, but without causing excess evacuation to prevent hydrogen wastage, under all the operating conditions of the fuel cell.

For example, the periodicity of purges may vary from 2 s to 20 s for an opening time respectively varying from 500 ms to 100 ms. The first purge is triggered by the control unit of the cell after a pre-set operating time, for example after a cell operating time of a few seconds. An output value (opening time of the purge valve) is then used to determine the periodicity of the following purges.

In one variant, a minimum opening time and a maximum opening time of the purge valve 2 can be defined, and these values can be stored in the memory of the cell control unit to detect faults (jamming of the purge valve 2 in the open or closed position, or a possible anomaly on the hydrogen circuit).

Alternatively, the coherency of pressure changes can be monitored at the inlet to the anode circuit. To detect jamming of the purge valve in the closed position, it can be verified whether or not the pressure value $P_{low}$ is reached after the maximum opening time. To detect jamming of the purge valve in the open position, the return to pressure $P_{nom}$ can be verified after closing the purge valve. Therefore, if during operation, the time measured to reach the pressure value $P_{low}$ after opening of the purge valve instructed by the control unit exceeds a pre-set maximum value, it can be inferred that there is jamming of the purge valve in the closed position. If the control unit gives instruction for closing of the purge valve starting from $P_{low}$ and the measured pressure does not reach $P_{nom}$ sufficiently quickly, within a pre-set time interval, it can be inferred that there is jamming of the purge valve in the open position. In this case, the control unit can display error messages corresponding to the detected anomaly.

What is claimed is:

1. A method for controlling humidity in a fuel cell, the method comprising:
   feeding hydrogen to the fuel cell at a nominal pressure at an inlet of the fuel cell; and
   repeating, with an electronic control unit, the following steps at a predetermined periodicity:
      at a first moment in time, opening a hydrogen purge valve arranged on an outlet of an anode circuit of the fuel cell, wherein the opening of the hydrogen purge valve evacuates liquid water present at the anode and gases;
      measuring a pressure of hydrogen at an inlet to the anode circuit of the fuel cell, and comparing the measured value of the pressure of hydrogen at the inlet to the anode circuit to a predetermined threshold pressure value, wherein the predetermined threshold pressure value is equal to a hydrogen pressure at which liquid water stops being evacuated via the open hydrogen purge valve;
      at a second moment in time, closing the hydrogen purge valve when the measured pressure of the hydrogen at the inlet to the anode circuit is equal to or lower than the predetermined threshold pressure value;
      measuring an opening time of the hydrogen purge valve, as a time difference between the first moment in time and the second moment in time;
      comparing the measured opening time of the hydrogen purge valve to a pre-set threshold opening time value;
      determining a humidity level prevailing at a cathode of the fuel cell from the result of the comparison of the measured opening time of the hydrogen purge valve to the pre-set threshold opening time value; and
      adjusting the operation of the fuel cell when the measured opening time of the hydrogen purge valve exceeds the pre-set threshold opening time value to decrease the humidity prevailing at the cathode of the fuel cell;
   thereby controlling the humidity in the fuel cell.

2. The method according to claim 1, further comprising:
   computing a mean of several successive measured opening times of the hydrogen purge valve; and
   determining the humidity level prevailing at the cathode of the fuel cell from said computed mean.

3. The method according to claim 1, wherein the feeding of hydrogen to the fuel cell is obtained from a tank by means of a proportional solenoid valve driven by a pressure regulator connected to a pressure sensor.

4. The method according to claim 3, wherein that said pressure regulator is deactivated during the opening time of the hydrogen purge valve.

5. The method according to claim 1, wherein the predetermined threshold pressure value is between 70 and 95% of the nominal pressure.

6. The method according to claim 1, wherein the nominal pressure value is between 1.2 and 2 bars.

7. The method according to claim 1, wherein said predetermined periodicity is adapted as a function of the measured opening time of the hydrogen purge valve of a previous purge.

8. The method according to claim 1, wherein said predetermined periodicity is between 2 s and 20 s when the measured opening time of the hydrogen purge valve is between 500 ms and 100 ms.

9. The method according to claim 1, further comprising:
   when the hydrogen purge valve is opened, measuring the time after which the predetermined threshold pressure value is reached starting from the nominal pressure;
   comparing said measured time with a maximum value; and
   determining that the hydrogen purge valve is jammed in the closed position if said measured time exceeds said maximum value; and
   provide notice of the jam of the hydrogen purge valve in the closed position.

10. The method according to claim 1, further comprising:
when the hydrogen purge valve is closed, measuring the time after which the nominal pressure is reached starting from the predetermined threshold pressure value;
comparing the measured time with a time interval; and
determining that the hydrogen purge valve is jammed in the open position if said measured time exceeds said time interval; and
provide notice of the jam of the hydrogen purge valve in the open position.

11. The method according to claim 1, further comprising:
when the measured opening time of the hydrogen purge valve is below a threshold opening time value, determining that the humidity level prevailing at the cathode is within a range lower than a threshold humidity value.

12. The method according to claim 1, further comprising:
when the measured opening time of the hydrogen purge valve is above a threshold opening time value, determining that the humidity level prevailing at the cathode is within a range higher than a threshold humidity value; and
determining the value of the humidity level prevailing at the cathode on the basis of an unambiguous relationship between the measured opening time and the humidity level prevailing at the cathode.

13. A device comprising a hydrogen purge valve, a pressure sensor, and an electronic control unit of a fuel cell, wherein the electronic control unit is configured to implement the method of claim 1.

14. The method according to claim 1, wherein the adjusting of the operation of the fuel cell comprises adjusting one or more parameters selected from the group consisting of humidification, pressure, stoichiometry, and temperature.

* * * * *